Patented Apr. 25, 1944

2,347,339

UNITED STATES PATENT OFFICE 2,347,339

METHOD OF PRESERVING FRUIT JUICES

Gray Singleton, Fort Meade, Fla.

No Drawing. Application October 22, 1942,
Serial No. 462,967

3 Claims. (Cl. 99—155)

This invention relates to a process for preserving fruit juices and is more particularly directed to the method preparing fruit syrups described and claimed in my Patent No. 2,297,331, dated September 29, 1942.

It has been reported by many investigators that the juice of certain fruits develops disagreeable flavors and odors when sterilized and sealed in containers. In work carried on for many years by the applicant, it has been demonstrated that these odors and flavors are caused by the oxidation of certain fats and/or oils contained in the fruit juices. The undesirable reaction seems to occur when an unsaturated fatty acid is contained in the molecular structure of a fat, an oil, a terpene, a wax or a resin which is exposed to the oxidizing action of the air included in the container or oxygen from any source coming on contact with the unsaturated fatty acid.

Many attempts have been made to overcome this condition. Attempts to seal orange juice in containers without allowing air to come in contact with the juices have been only partially successful due to the difficulty of removing occluded air from the juice and possible formation of oxidizing compounds by chemical or enzyme action. Attempts have been made to remove the oils, fats, terpenes, etc., from the juices before sealing in containers. None of these, however, have been successful.

An object of the invention is the provision of an easy, quick, and inexpensive process for preserving fruit juices which will eliminate undesirable odors and flavors caused by the oxidation of fats, oils, a terpene, a wax or a resin contained in the juices while maintaining the ascorbic acid intact.

Another object of the invention is the provision of a process for preserving fruit juices in which the fresh juices of the fruit are brought to the boiling point and all fatty matter or other substances which rises to the top is removed promptly, the hot juices being then sealed in sterile containers.

A further object of the invention is the provision of a process for preserving fruit juices in which all ingredients that cause rancidity and unpleasant odors, are removed, a predetermined quantity of sodium chloride being added to make the canned juice more palatable and prevent the acids of the juices from attacking the metal of the containers while permitting canning of the juices before the fruit has reached the full ripe stage.

A still further object of the invention is the provision of a process for preserving fruit juices so that they can be stored and transported to foreign countries at normal temperatures without developing rancid odors and flavors and without excessive loss of ascorbic acid.

The juice of oranges, grapefruit, tangerines, lemons, limes, calamondins, tangelos or other fruit juice which tends to become rancid when canned, is removed from the fruit in any convenient manner. No care need be taken to prevent the inclusion of air or oil. Immediately after the juice is removed from the fruit it is brought to a boil in a porcelain, glass or other kettle which is not constructed of a material which will have a catalytic effect on the ascorbic acid contained in the juice. As the juice comes to a boil, the fats, oils, etc., carrying the unsaturated fatty acids, separate from the juice and rise to the top, forming a thick, heavy layer of the consistency of rich cream. This layer is easily removed by skimming or any other convenient method. The juice can then be sealed in airtight containers and keeps perfectly without developing any objectionable taste or odor. In other words, that part of the juice which can become rancid has been removed. If the material that is removed in the layer that forms on top of the juice is sealed in sterile containers, it develops a very strong rancid odor and flavor.

It was found by experiment that juice canned in the usual way could be boiled after the rancid odor and flavor had developed and the same yellow layer separated as with the fresh juice. When this layer was removed, there was no more rancid odor or flavor, and the juice was good for drinking. Samples of this juice, from which the rancid fats and oils had been removed, were sealed in sterile containers and kept in good condition for two years without developing any rancid odor or flavor.

In order to determine the effect of storage temperatures on orange juice prepared as described above, samples were canned and stored at room temperature for two years. No rancid odor or flavor developed. Other cans were placed in the rear compartment of an automobile which was allowed to stand in the sun all summer. Temperatures in this compartment frequently reached 140 degrees, fahrenheit, in the middle of the day. After one year, this juice had developed no rancid flavor, and the test was discontinued. This is important because juice canned in the usual way must be kept in a cool place if it is to be at all fit for human consumption.

Juice prepared as described in this method was tested for ascorbic acid (vitamin C) and it was found that, after six months' storage, it had 19 milligrams more ascorbic acid per cubic centimeter than juice canned in the usual way. Since the ascorbic acid content of orange, and many other fruit juices, is higher before the fruit reaches the dead ripe stage, it is desirable to can the juice when the fruit is just maturing and before it loses its sharp, acid taste. Juice canned at early maturity has a rather high acid content and tends to attack the can. It was found that this could be prevented by adding approximately one-third teaspoonful of common table salt (sodium chloride) to each gallon of juice. This makes the sour juice much more palatable, prevents attack on the metal of the can, and permits canning of juice at least three weeks earlier than would otherwise be possible. It is at this stage that the juice has the maximum content of ascorbic acid. The amount of salt should be varied with the maturity of the juice and the acid content. Certain varieties of oranges carry a high acid content in the juice until late in the season.

Early in the season, orange juice has a high content of ascorbic acid but lacks flavor. Palatability can be greatly improved by adding the ground peel of two to four oranges to each gallon of juice. The peel rises to the top with the layer of fats and oils and is removed with them. The time required to remove the fats and oils from the juice varies with different varieties and the season of the year. Usually all the fats and oils have separated and come to the top after five minutes of boiling. In some cases, as much as fifteen minutes is required. It is easy to determine when the separation is complete because no more yellow layer is formed after removal of that which has accumulated.

This method produces a juice of excellent flavor which retains a high content of ascorbic acid even when stored and transported at ordinary temperatures. This permits shipment to foreign countries and to armed forces at distant posts where good juice cannot be delivered under the usual canning methods.

The peel of the fruits add flavor to the juice, and this is particularly true of citrus fruits. There is a small amount of vitamin A in the peel of the fruit such as oranges, and therefore, some vitamin A is aded to the juice by the use of the peel when employed for adding flavor to the juice.

I claim:

1. The process for preserving citrus fruit juices which comprises expressing the juice from the fruit, adding approximately ⅓ of a teaspoonful of salt to each gallon of juice to prevent the acid of the fruit from acting on the subsequently filled containers, boiling the juice in a container formed of a material which will not have a catalytic effect on the ascorbic acid content of the juice, heating said juice to the boiling point and maintaining the temperature from five to fifteen minutes to cause the fats, oils and other substances which cause rancidity to be separated from the juice and floated on the top, removing the separated substances, and then sealing the heated juice in containers.

2. The process of preserving citrus fruit juices, which comprises expressing the juice from the fruits, adding to said juice the crushed peel of a citrus fruit and approximately ⅓ of a teaspoonful of salt to each gallon of juice, heating the juices in a container formed of a material which will not have a catalytic effect on the ascorbic acid content of the juices, and maintaining the boiling temperature until the fats, oils and other substances which cause rancidity have separated from the juice, removing the peel and separated substances from the juice, then sealing the juice while hot in containers.

3. The process for removing from canned citrus fruit juices substances that cause rancid odors and flavors, which comprises removing said juices from sealed containers, adding to said juice approximately ⅓ of a teaspoonful of sodium chloride, heating the juices to the boiling point in a container formed of a material which will not have a catalytic effect on the ascorbic acid content of the juices, maintaining the juices at the boiling point until the fats and oils and other substances which cause rancidity are separated from the juices, removing the separated substances from the juice, then sealing the heated juice in containers.

GRAY SINGLETON.